United States Patent

[11] 3,593,965

[72] Inventor Bruno Morane
  Paris, France
[21] Appl. No. 777,602
[22] Filed Nov. 21, 1968
[45] Patented July 20, 1971
[73] Assignee L'Oreal
  Paris, France
[32] Priority May 8, 1968
[33] France
[31] 150,909

[54] DEVICE FOR MIXING A PLURALITY OF FLUIDS WHICH ARE TO BE SIMULTANEOUSLY DISPENSED
6 Claims, 3 Drawing Figs.

[52] U.S. Cl. ................................................... 259/4
[51] Int. Cl. ................................................... B01f 15/02
[50] Field of Search .......................................... 259/4, 18, 36; 138/38, 42

[56] References Cited
UNITED STATES PATENTS

| | | | |
|---|---|---|---|
| 542,755 | 7/1895 | Ekenberg | 259/4 |
| 1,490,333 | 4/1924 | Lichtenthaeler | 259/4 |
| 1,964,300 | 6/1934 | Perry et al. | 138/42 X |
| 2,021,079 | 11/1935 | Mittendorf et al. | 138/42 |
| 2,080,616 | 5/1937 | Lynn et al. | 259/4 X |
| 2,481,705 | 9/1949 | Whitney | 138/42 |
| 2,815,532 | 12/1957 | Braunlich | 259/4 X |
| 3,185,447 | 5/1965 | Hach | 259/4 |

*Primary Examiner*—James Kee Chi
*Attorney*—Holcombe, Wetherill & Brisebois

ABSTRACT: A mixer for a plurality of fluids comprising a disc sandwiched between two flat surfaces, said disc being provided on both sides with a network of intersecting grooves passageways through said disc connecting the two networks of grooves, an inlet in one of said flat surfaces affording access to one network, and an outlet in the other surface connected to the other network.

PATENTED JUL 20 1971 3,593,965

3,593,965

DEVICE FOR MIXING A PLURALITY OF FLUIDS WHICH ARE TO BE SIMULTANEOUSLY DISPENSED

It is frequently necessary to distribute simultaneously through one or more valves, a plurality of pressurized fluids which must be mixed as thoroughly as possible, either in order to produce a homogenous product, or to facilitate a reaction between the various fluids.

Moreover, the mixing means attached to the valves for dispensing such fluids must be as inexpensive as possible, since they ordinarily form part of the package in which the fluids to be mixed are sold.

Finally, when the dispenser is to be used at widely separated times, it is desirable, in order to avoid clogging of the device, to be able to easily remove and clean the mixing means.

The present invention relates to a washable, easily removable mixer, which is both inexpensive and effective. The mixer according to the invention is also quite small, which is most advantageous, because it occupies only a small portion of the total volume of the package containing the fluids.

It is an object of the invention to provide as a new article of manufacture a mixing device for fluids which are to be simultaneously dispensed and are packaged under pressure. This device is essentially characterized by the fact that it comprises at least one flat disc, the two faces of which contact the opposed flat surfaces of a suitable seat. This disc is provided on each surface with an identically arranged set of grooves, comprising a principal diametral groove closed at both ends, and feeding obliquely disposed secondary grooves positioned symmetrically about the diameter of the disc which is perpendicular to the principal groove. These oblique grooves open into a circular groove extending around the periphery of the disc. The circular grooves on each side of the disc are connected by holes in alignment with the principal groove, the two surfaces of the seat being apertured in alignment with the center of said disc.

In a preferred embodiment of the invention, the seat for the mixing disc according to the invention comprises a cylinder, the lower surface of which rests on a valve through which the liquids to be mixed are simultaneously dispensed. This cylinder comprises a flat web encircled by a rim, the center of which web is pierced by an orifice through which the fluids to be dispensed may be introduced. The grooved disc is simply laid on the web and held in place by the pressure of the upper surface of the seat, which is formed by a cover screwed onto the lower part, the bottom of this cover being perfectly flat. It is provided at its center with an orifice through which the homogenous mixture of the fluids being dispensed departs.

In one application of the invention, a dispensing cap may be mounted on the cover and supplied through said orifice. This cap may be of the type described in my copending application, Ser. No. 777,598, filed on the same day as this application.

In order that the invention may be better understood, one embodiment thereof will now be described, purely by way of example, with reference to the accompanying drawings, in which.

Figure 1:
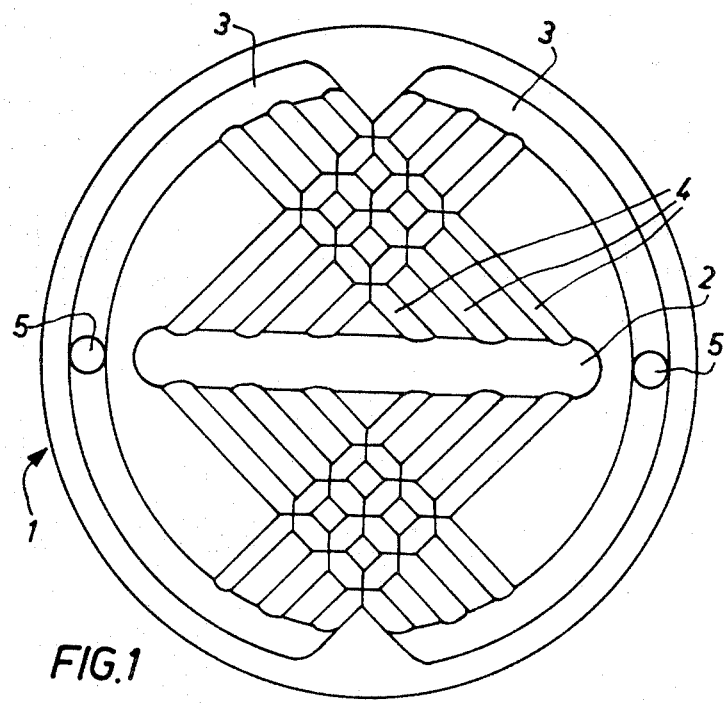
FIG. 1 is a plan view of a mixing disc according to the invention.
Figure 2:
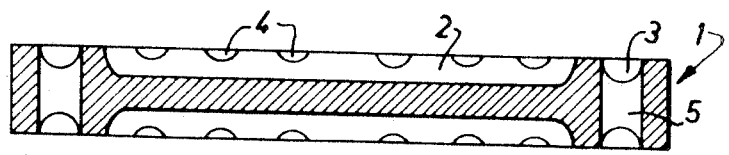
FIG. 2 is a diametral section taken through the disc of FIG. 1.
Figure 3:
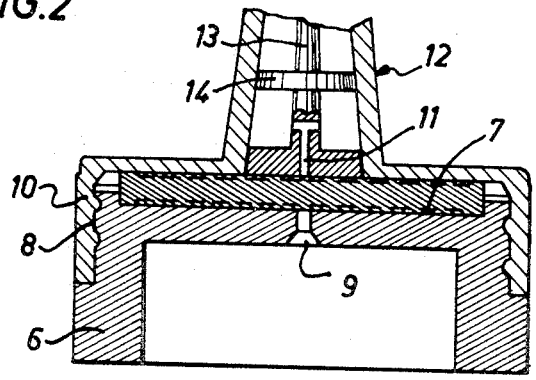
FIG. 3 shows the disc of FIG. 1 mounted in its seat to form a complete mixing device.

The disc 1 is made of molded plastic and has a thickness of about 3 mm. It is provided with a diametral principal groove 2 which is closed at both ends. Arcuate grooves 3 are located on each side of the disc. Each groove 3 extends for about 180° and they are positioned symmetrically on opposite sides of a diameter perpendicular to that of the principal groove 2. At the end of each arcuate groove 3, in alignment with the principal groove 2, is an orifice 5 connecting the two faces of the disc.

The principal groove 2 is connected to the arcuate grooves 3 by two sets of six oblique grooves 4, each set comprising twice three oblique grooves at substantially right angles to each other, as shown in FIG. 1. The grooves in each set consequently cross each other at a total of nine points.

The grooves 2, 3 and 4 are of different depths. They are all semicircular in section, with grooves 2 having a radius of 1 mm., grooves 3 having a radius of 0.7 mm., and grooves 4 having a radius of 0.4 mm., in the selected example.

The two surfaces of the disc 1 are provided with identical sets of grooves, positioned exactly opposite each other.

The disc 1 is mounted on a lower base identified by reference numeral 6. This base comprises a flat circular web 7 encircled by a centering rim 8. There is a hole 9 at the center of the web 7 which is supplied through a valve, not shown, for simultaneously dispensing a plurality of fluids. The disc 1 is seated on the web 7 and centered by the rim 8. It is held down on the web 7 by the cover 10 which is screwed onto threads carried by the base 6. The bottom of the cover 10 is perfectly flat and it is provided at its center with an orifice 11 through which the mixture of fluids is dispensed.

The orifice 11, in the embodiment described, is the inlet of a distributing cap which is adapted to homogenize the mixture and prolong the time required for the mixture to pass through the cap. This is particularly desirable in the case of certain cosmetics, when a gel is to be formed from a plurality of liquid components.

Reference numeral 12 indicates the distributing cap as a whole, comprising a central column 13 carrying a plurality of notched discs 14. This cap is described in detail in said copending application.

When the user opens the distribution valve, the orifice 9 of the base 6 is simultaneously supplied with the various fluids to be dispensed, which have not yet been properly mixed together. They then reach the center of the groove 2 in the lower surface of the disc and are at that point divided into streams which flow through the grooves 4 leading away from both sides of the groove 2, to the nine points at which these grooves cross each other. This result in an intimate mixture of the fluids, which then flow into the arcuate grooves 3 toward the orifices 5. The mixture then passes through these orifices onto the upper face of the disc 1. The mixture then travels along an identical path, but in the opposite direction, passing first along the arcuate grooves 3, then through the grooves 4, and finally into the principal groove 2. Further mixing occurs at the intersections between these grooves.

The resulting mixture of fluids then reaches the principal groove 2 in the upper surface of the disc 1, and is finally evacuated from the device through the orifice 11, just above the center of the groove 2. This orifice leads to the dispensing cap 12 which is, as has already been explained, adapted to increase the time the mixture is retained inside the apparatus before it is dispensed for use.

In order to render the device more efficacious, it is only necessary to increase the number of discs, superposing one on the other until the desired mixing effect is produced.

It will of course be appreciated that the embodiment which has just been described may be modified as to detail without thereby departing from the basic principles of the invention.

What I claim is:

1. A mixing device for simultaneously dispensing a plurality of fluids packaged under pressure, said device comprising a single flat plate enclosed in a chamber, said plate having two oppositely facing flat surfaces, each abutting a corresponding flat surface on the inside of said chamber, a network of intersecting grooves in each surface of said plate, one of said networks being formed to conduct fluids from an inlet in the wall of said chamber to at least one orifice in said plate, and the network on the other side being formed to conduct fluids from said at least one orifice to an outlet in said chamber wall.

2. A mixing device as claimed in claim 1 in which said grooves are in said plate, and said inlet and outlet are aligned on opposite sides of the center of said plate, said at least one orifice being positioned near the periphery thereof.

3. A mixing device as claimed in claim 2 in which each network comprises a diametral central groove connected to a plurality of intersecting transverse grooves leading to two discrete arcuate grooves, each of which is connected to an orifice extending through said plate.

4. A mixing device as claimed in claim 1 in which said chamber comprises two sections which are screwed together.

5. A mixing device as claimed in claim 4 in which one of said sections comprises a web the upper surface of which abuts said disc, and is provided with a peripheral rim.

6. A mixing disc as claimed in claim 4 in which the upper part of said chamber is defined by a cover attached to a dispensing cap baffled to prolong the time required for fluid to pass therethrough.